UNITED STATES PATENT OFFICE.

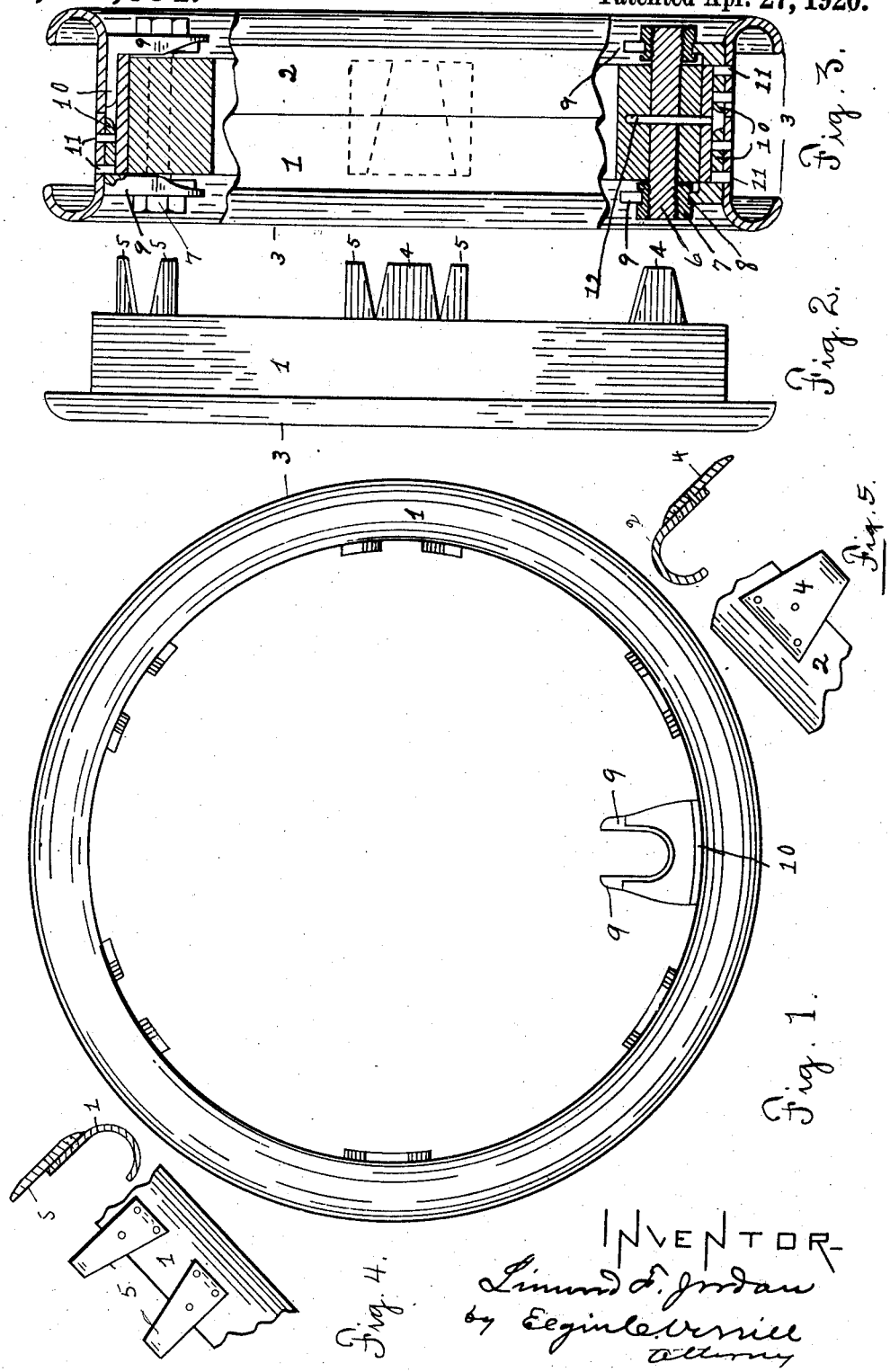

LINWOOD F. JORDAN, OF PORTLAND, MAINE.

VEHICLE-WHEEL.

1,338,634.     Specification of Letters Patent.     Patented Apr. 27, 1920.

Application filed October 17, 1918. Serial No. 258,509.

*To all whom it may concern:*

Be it known that I, LINWOOD F. JORDAN, a citizen of the United States, residing at Portland, in the county of Cumberland and State of Maine, have invented certain new and useful Improvements in Vehicle-Wheels, of which the following is a specification.

This invention relates to improvements in vehicle wheels designed to support hard or pneumatic tires. Its objects among others are to provide a rim which is practicable, simple and cheap in construction and easily and quickly mounted upon or removed from the permanent rim which may be the felly or felly band, hereafter, for convenience, referred to as the permanent rim.

The rim consists of two equal circular members, their inner edges adapted to engage and their outer edges terminating in or being provided with the usual tire engaging flanges. The two members may be similar but not necessarily so, the essential structure being such that the members, when placed together, form a complete rim. The invention also consists in providing the rim members with means for preventing one from rotary movement relative to the other. The invention further consists in means for locking the two rim members upon the permanent rim and in means for forcibly removing one independently of the other. The invention further consists in certain details of construction which will be hereinafter specifically set out.

In the drawing herewith accompanying and making a part of this application, Figure 1 is a side elevation of my improved rim showing only one of the holding lugs; Fig. 2 is a peripheral face elevation of one of the rim members; Fig. 3 is a similar view of the two rim members assembled on the felly, parts being broken away; Fig. 4 is a face view and section respectively of one of the locking members and Fig. 5 is a face view and section respectively of the other locking members.

The same reference characters indicate like parts in the several figures.

It will be noted that the rim consists of two members which may be used interchangeably. In said drawings, the numeral 1 indicates one of the rim members and 2 the other member. These members have tire holding flanges 3 which may be of any convenient design. The rim is divided circumferentially into two parts and these parts are adapted to be locked against rotary movement one relative to the other by means of interlocking tongue and tongue receiving members 4 and 5, respectively. These interlocking members are riveted or otherwise secured to the inside of the rim members. The rim members, when placed in position upon the permanent rim, are adapted to be locked together and to the permanent rim by bolts 6 and jack nuts 7, the bolt being secured to the permanent rim and the jack nuts being provided with grooves 8 to receive the socketed flanges 9 of the wedges 10 which are secured to the inside of each of the rim members. The bolts 6 are fixedly positioned in the permanent rim by pins 12 passing through the permanent rim and into or through the bolts. Any convenient means of securing the bolts to the permanent rim may be used and will be within the spirit and scope of my invention.

It will be noted that the bolts are fixedly secured to the permanent rim and the wedges are permanently secured to the inside of the rim. The rim members are slid on and off the permanent rim one from either side. When in position, the jack nuts 7 are set in forcing the rim into position which is governed by the engagement of the wedges with the permanent rim. To demount the rim members, the jack nuts are turned off carrying with them the rim.

I claim:

1. In a vehicle wheel, a permanent rim in combination with a tire rim comprising two similar members having adjacent contacting edges when in position, each provided with wedges secured to the inside of each member and having external flanges, and means engaging said flanges adapted to force either member off from the permanent rim.

2. In a vehicle wheel, a permanent rim having threaded bolts secured thereto in combination with a tire rim divided circumferentially into two similar members, wedges permanently secured to the insides of the tire rim members having outwardly extending flanges, and contact nuts having threaded engagement with said bolts and provided with grooves adapted to receive said flanges, whereby the turning of the nuts forces the tire rim members on or off from the permanent rim.

3. In a vehicle wheel, a permanent rim, bolts fixedly secured to said permanent rim and provided with threaded nuts in combination with two circumferentially divided tire rim members having adjacent contacting edges, wedges secured to the insides of the divided rim members having outwardly extending solid flanges, and contact nuts having threaded engagement with said bolts and provided with grooves adapted to receive said flanges, whereby the turning of the nuts forces the rim members on or off from the permanent rim according as the nuts are turned, the inside rim member being free to be moved outwardly over the rim.

4. In a vehicle wheel, a permanent rim in combination with a tire rim comprising two similar members provided with wedges permanently secured to the sides of the tire rim and having external flanges, and means engaging said flanges adapted to force the tire rim members on or off from the permanent rim, the inner tire rim member being provided with a section of an inner diameter equal to or greater than the outer diameter of the permanent rim, whereby it may be removed from the permanent rim without removing the wheel from the axle.

In testimony whereof I affix my signature.

LINWOOD F. JORDAN.